US010631246B2

(12) United States Patent
Jiang et al.

(10) Patent No.: US 10,631,246 B2
(45) Date of Patent: Apr. 21, 2020

(54) TASK SWITCHING ON MOBILE DEVICES

(75) Inventors: Rachel Jiang, Redmond, WA (US);
Rhoniel Villano Manlapaz, Bellevue, WA (US); Megan Galbraith Donahue, Seattle, WA (US); Amy Elizabeth Alberts, Seattle, WA (US); Jan H. Karachale, Sammamish, WA (US); Ashwini Varma, Redmond, WA (US); Vijayendra Gopalrao Vasu, Redmond, WA (US); Alan Michael Bush, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/162,096

(22) Filed: Jun. 16, 2011

(65) Prior Publication Data

US 2012/0210266 A1 Aug. 16, 2012

Related U.S. Application Data

(60) Provisional application No. 61/442,713, filed on Feb. 14, 2011.

(51) Int. Cl.
*G05B 19/409* (2006.01)
*G06Q 10/10* (2012.01)
(Continued)

(52) U.S. Cl.
CPC ....... *H04W 52/0264* (2013.01); *G06F 9/5011* (2013.01); *G06F 9/546* (2013.01);
(Continued)

(58) Field of Classification Search
CPC ............... G06F 3/0481; G06F 3/04817; G06F 3/04847; G06F 9/4443; G06F 11/3664
(Continued)

(56) References Cited

U.S. PATENT DOCUMENTS 5,655,081 A 8/1997 Bonnell et al.
5,938,723 A 8/1999 Hales et al.
(Continued)

FOREIGN PATENT DOCUMENTS

EP 0509946 10/1992

OTHER PUBLICATIONS

"Subsets of Sets", http://sites.csn.edu/istewart/Math120/SetTheory/subsets.html, retrieved Apr. 28, 2017.*
(Continued)

*Primary Examiner* — Shourjo Dasgupta
(74) *Attorney, Agent, or Firm* — Alleman Hall Creasman & Tuttle LLP

(57) ABSTRACT

The subject disclosure is directed towards a task switching technology on a computing device such as a Smartphone. An application is comprised of one or more tasks. When a user requests that another task be executed, information about the previously executing task (e.g., including a screenshot) is preserved to a stack. If the user invokes a task switcher program, the user is presented with a view of the stack, e.g., containing the screenshots (and representative text) of the tasks that previously executed. The user may navigate among those presented task representations to arbitrarily select any one, with the selected task resumed upon selection.

18 Claims, 6 Drawing Sheets

US 10,631,246 B2
Page 2

(51) Int. Cl.

| | | |
|---|---|---|
| H04N 5/445 | (2011.01) | |
| H04N 7/173 | (2011.01) | |
| G09G 5/14 | (2006.01) | |
| H04M 1/725 | (2006.01) | |
| G06F 1/16 | (2006.01) | |
| G06F 3/0481 | (2013.01) | |
| G06F 3/0484 | (2013.01) | |
| G06F 3/0482 | (2013.01) | |
| G06F 3/0486 | (2013.01) | |
| H04W 52/02 | (2009.01) | |
| H04N 21/233 | (2011.01) | |
| H04N 21/439 | (2011.01) | |
| H04N 21/61 | (2011.01) | |
| G06F 9/50 | (2006.01) | |
| G06F 9/54 | (2006.01) | |
| H04W 4/60 | (2018.01) | |
| H04W 4/50 | (2018.01) | |
| H04N 21/41 | (2011.01) | |
| H04L 12/24 | (2006.01) | |

(52) U.S. Cl.
CPC ....... H04L 41/0893 (2013.01); H04N 21/233 (2013.01); H04N 21/4126 (2013.01); H04N 21/439 (2013.01); H04N 21/6175 (2013.01); H04W 4/50 (2018.02); H04W 4/60 (2018.02); Y02D 70/00 (2018.01); Y02D 70/12 (2018.01); Y02D 70/124 (2018.01); Y02D 70/142 (2018.01); Y02D 70/144 (2018.01); Y02D 70/146 (2018.01); Y02D 70/164 (2018.01); Y02D 70/23 (2018.01); Y02D 70/26 (2018.01)

(58) Field of Classification Search
USPC .......................................................... 715/772
See application file for complete search history.

(56) References Cited

U.S. PATENT DOCUMENTS

| | | | |
|---|---|---|---|
| 6,005,488 A * | 12/1999 | Symanow et al. ......... 340/12.23 | |
| 6,324,411 B1 | 11/2001 | Genell | |
| 6,683,938 B1 | 1/2004 | Henderson | |
| 6,874,145 B1 | 3/2005 | Ye et al. | |
| 7,124,424 B2 | 10/2006 | Gordon et al. | |
| 7,146,439 B1 | 12/2006 | Ofer et al. | |
| 7,234,035 B2 | 6/2007 | Jerding et al. | |
| 7,237,240 B1 * | 6/2007 | Chen ..................... G06F 9/4443 | |
| | | | 707/999.001 |
| 7,275,085 B1 | 9/2007 | Tran | |
| 7,346,855 B2 | 3/2008 | Hellyar et al. | |
| 7,512,952 B1 | 3/2009 | Liu et al. | |
| 7,535,456 B2 * | 5/2009 | Liberty et al. ............... 345/158 | |
| 7,539,483 B2 | 5/2009 | Jerding et al. | |
| 7,546,602 B2 * | 6/2009 | Hejlsberg et al. ........... 719/313 | |
| 7,844,972 B2 | 11/2010 | Raja et al. | |
| 7,971,204 B2 | 6/2011 | Jackson et al. | |
| 8,082,008 B2 | 12/2011 | Hoffman et al. | |
| 8,175,653 B2 | 5/2012 | Smuga et al. | |
| 8,196,213 B2 | 6/2012 | Klucher et al. | |
| 8,418,186 B2 | 4/2013 | Jackson et al. | |
| 8,458,498 B2 | 6/2013 | Rotem et al. | |
| 8,495,403 B2 | 7/2013 | Wang et al. | |
| 8,499,312 B2 | 7/2013 | Naresh et al. | |
| 8,510,743 B2 | 8/2013 | Hackborn et al. | |
| 8,515,797 B2 | 8/2013 | Ernst et al. | |
| 8,698,822 B1 * | 4/2014 | Schickler et al. ........... 345/530 | |
| 10,009,850 B2 | 6/2018 | McClure et al. | |
| 2002/0012329 A1 * | 1/2002 | Atkinson et al. ........... 370/330 | |
| 2002/0104097 A1 | 8/2002 | Jerding et al. | |
| 2003/0061260 A1 | 3/2003 | Rajkumar | |
| 2003/0227567 A1 | 12/2003 | Plotnick et al. | |
| 2004/0102861 A1 | 5/2004 | Han | |
| 2004/0153504 A1 * | 8/2004 | Hutchinson ....... G06F 17/30017 | |
| | | | 709/204 |
| 2004/0194153 A1 | 9/2004 | Garg | |
| 2005/0022157 A1 | 1/2005 | Brendle et al. | |
| 2005/0024341 A1 * | 2/2005 | Gillespie ............... G06F 1/1616 | |
| | | | 345/173 |
| 2005/0026654 A1 | 2/2005 | Perez et al. | |
| 2005/0120306 A1 * | 6/2005 | Klassen et al. ............... 715/765 | |
| 2005/0149879 A1 * | 7/2005 | Jobs ...................... G06F 3/0481 | |
| | | | 715/796 |
| 2005/0172326 A1 | 8/2005 | Jerding et al. | |
| 2005/0278449 A1 | 12/2005 | Moss et al. | |
| 2006/0134959 A1 * | 6/2006 | Ellenbogen .................... 439/297 | |
| 2006/0136882 A1 | 6/2006 | Noonan et al. | |
| 2006/0213754 A1 | 9/2006 | Jarrett et al. | |
| 2006/0236368 A1 | 10/2006 | Raja et al. | |
| 2006/0242602 A1 * | 10/2006 | Schechter et al. ........... 715/838 | |
| 2006/0245237 A1 | 11/2006 | Nguyen et al. | |
| 2006/0265726 A1 | 11/2006 | Byun et al. | |
| 2006/0288336 A1 | 12/2006 | Trowbridge et al. | |
| 2007/0036137 A1 * | 2/2007 | Horner et al. ................. 370/352 | |
| 2007/0038763 A1 | 2/2007 | Oestvall | |
| 2007/0068367 A1 | 3/2007 | Schmidt et al. | |
| 2007/0094665 A1 | 4/2007 | Jackson | |
| 2007/0220445 A1 | 9/2007 | Yach et al. | |
| 2007/0223533 A1 * | 9/2007 | Kirrmann et al. ............. 370/469 | |
| 2007/0244586 A1 | 10/2007 | Champion et al. | |
| 2007/0294699 A1 | 12/2007 | Bahl et al. | |
| 2008/0052717 A1 | 2/2008 | Lee | |
| 2008/0066006 A1 | 3/2008 | Kim | |
| 2008/0082936 A1 | 4/2008 | Helvick | |
| 2008/0109753 A1 * | 5/2008 | Karstens ............... G06F 9/4443 | |
| | | | 715/802 |
| 2008/0125180 A1 | 5/2008 | Hoffman et al. | |
| 2008/0141131 A1 | 6/2008 | Cerny et al. | |
| 2008/0154601 A1 | 6/2008 | Stifelman et al. | |
| 2008/0172698 A1 | 7/2008 | Berger et al. | |
| 2008/0222153 A1 | 9/2008 | Naresh et al. | |
| 2008/0298697 A1 * | 12/2008 | Lee ...................... G06F 3/04817 | |
| | | | 382/243 |
| 2009/0010494 A1 * | 1/2009 | Bechtel ................. B60Q 1/1423 | |
| | | | 382/104 |
| 2009/0019369 A1 * | 1/2009 | Borovsky ........... G06F 3/04883 | |
| | | | 715/736 |
| 2009/0028127 A1 | 1/2009 | Walker et al. | |
| 2009/0113444 A1 | 4/2009 | Hackborn et al. | |
| 2009/0227279 A1 | 9/2009 | Yuki | |
| 2009/0249247 A1 | 10/2009 | Tseng et al. | |
| 2009/0300192 A1 | 12/2009 | Northrup | |
| 2009/0327953 A1 | 12/2009 | Honkala et al. | |
| 2010/0008645 A1 * | 1/2010 | Katata .................. G11B 27/034 | |
| | | | 386/240 |
| 2010/0011446 A1 | 1/2010 | Klucher et al. | |
| 2010/0115048 A1 | 5/2010 | Scahill | |
| 2010/0138834 A1 | 6/2010 | Agarwal | |
| 2010/0153877 A1 * | 6/2010 | Rautava ................ G06F 9/4443 | |
| | | | 715/802 |
| 2010/0248787 A1 * | 9/2010 | Smuga .................. G06F 3/0482 | |
| | | | 455/566 |
| 2010/0250998 A1 | 9/2010 | Herdrich et al. | |
| 2010/0262973 A1 | 10/2010 | Ernst et al. | |
| 2010/0281481 A1 | 11/2010 | Rainisto et al. | |
| 2010/0289760 A1 * | 11/2010 | Jonoshita et al. ............. 345/173 | |
| 2010/0299187 A1 * | 11/2010 | Duggal ....................... 705/14.1 | |
| 2011/0035554 A1 | 2/2011 | Watson et al. | |
| 2011/0087989 A1 * | 4/2011 | McCann et al. ............... 715/772 | |
| 2011/0151885 A1 | 6/2011 | Buyukkoc et al. | |
| 2011/0202847 A1 * | 8/2011 | Dimitrov ....................... 715/738 | |
| 2011/0252430 A1 | 10/2011 | Chapman et al. | |
| 2011/0258323 A1 | 10/2011 | Jackson | |
| 2012/0081308 A1 * | 4/2012 | Sirpal .......................... 345/173 | |
| 2012/0102497 A1 | 4/2012 | Stahl | |
| 2012/0102504 A1 | 4/2012 | Iyer et al. | |
| 2012/0106463 A1 | 5/2012 | McBride et al. | |
| 2012/0158827 A1 | 6/2012 | Mathews | |
| 2012/0158829 A1 * | 6/2012 | Ahmavaara et al. .......... 709/203 | |
| 2012/0174020 A1 * | 7/2012 | Bell ....................... G06F 3/0481 | |
| | | | 715/779 |

(56) References Cited

U.S. PATENT DOCUMENTS

| | | | |
|---|---|---|---|
| 2012/0185532 A1 | 7/2012 | Kristiansson et al. | |
| 2012/0209413 A1 | 8/2012 | Xu et al. | |
| 2012/0209946 A1 | 8/2012 | McClure et al. | |
| 2012/0210266 A1 | 8/2012 | Jiang et al. | |
| 2012/0210321 A1 | 8/2012 | Silva et al. | |
| 2012/0210326 A1 | 8/2012 | Torr et al. | |
| 2012/0258722 A1 | 10/2012 | Liu | |
| 2012/0265874 A1 | 10/2012 | Hoh et al. | |
| 2012/0304108 A1* | 11/2012 | Jarrett | G06F 3/04883 715/781 |
| 2013/0115990 A1 | 5/2013 | Koc et al. | |
| 2014/0019873 A1 | 1/2014 | Gupta et al. | |

OTHER PUBLICATIONS

Aza Raskin, "Solving the Alt-Tab Problem", published on Aug. 5, 2009 to http://www.azarask.In/blog/post/solving-the-alt-tab-problem/, retrieved from web on Jun. 29, 2018.*
"Allocators, Containers, and Memory Allocation Algorithms", retrieved on Jan. 4, 2019 from https://www.boost.org/doc/libs/1_38_0/doc/html/interprocess/allocators_containers.html, published to web on Apr. 4, 2008 (Year: 2008).*
Herb Sutter, "Containers in Memory: How Big Is Big?", retrieved on Jan. 4, 2019 from www.gotw.ca/publications/mill14/htm, published to web on Jan. 15, 2001 (Year: 2001).*
"Notes on Stacks", retrieved on Jan. 4, 2019 from pages.cs.wisc.edu/~siff/CS367/Notes/stacks.html, published to web on Feb. 1, 2002 (Year: 2002).*
U.S. Appl. No. 13/164,678, filed Jun. 20, 2011, McClure, et al.
U.S. Appl. No. 13/164,497, filed Jun. 20, 2011, Silva, et al.
U.S. Appl. No. 13/162,459, filed Jun. 16, 2011, Xu, et al.
U.S. Appl. No. 13/162,936, filed Jun. 17, 2011, Torr, et al.
"Windows Phone 7 with multitasking—coming soon", Feb. 15, 2011, http://mobile.dzone.com/articles/windows-phone-7.
"International Search Report", dated Sep. 17, 2012, Application No. PCT/US2012/024790, Filed Date Feb. 12, 2012, pp. 1-9.
"International Search Report", dated Sep. 26, 2012, Application No. PCT/US2012/024789, Filed Date Feb. 12, 2012, pp. 1-9.
"International Search Report", dated Aug. 31, 2012, Application No. PCT/US2012/024024, Filed Date Feb. 6, 2012, pp. 1-10.
"Multitasking the Android way", retrieved at http://android-developers.blogspot.com/2010/04/multitasking-android-way.html., Apr. 28, 2010, 6 pages.
Chen, Brian X., "Wired.com Explains: How Mobile Multitasking Works", Wired.com, Jul. 1, 2010, http://www.wired.com/gadgetlab/2010/07/mobile-multitasking-explainer.
"iOS Application Programming Guide", retrieved at http://developer.apple.com/library/ios/documentation/iphone/conceptual/iphoneosprogrammingguide/iPhoneAppProgrammingGuide.pdf, Nov. 15, 2010, pp. 114.
Allen, Mitch, "Palm WebOS Rough Cuts", retrieved at http://justinput.googlecode.com/files/Palm_webOS_Rough_Cuts.pdf, Palm webOS, 1st Edition, Sep. 2, 2009, pp. 302. (PDF reference is uploaded in multiple parts due to file size).
Fei, et al., "An Energy-aware Framework for Coordinated Dynamic Software Management in Mobile Computers", retrieved at http://www.engr.uconn.edu/~yfei/publications/files/mascots04.pdf, Oct. 2004, pp. 12.
Mikic-Rakic, et al., "Middleware for Software Architecture-Based Development in Distributed, Mobile, and Resource-Constrained Environments", retrieved at http://csse.usc.edu/~softarch/Prism/publications/Mikic-Rakic_Medvidovic_Jakobac.pdf, Feb. 2002, pp. 13.

Kunz, et al., "An Architecture for Adaptive Mobile Applications", retrieved at http://people.dsv.su.se/~liwei/project/conf25.pdf, May 13, 1999, pp. 12.
"BlackBerry Tablet OS SDK for Adobe AIR", retrieved at http://docs.blackberry.com/en/developers/deliverables/24118/BlackBerry_Tablet_OS_SDK_for_Adobe_AIR-Development_Guide--1449712-0112050519-001-0.9.2_Beta-US.pdf, Feb. 17, 2011, pp. 117.
"Running your app in the background (tombstoning)", retrieved at http://create.msdn.com/en-US/education/quickstarts/Running_your_App_in_the_Background_(Tombstoning), retrieved on Feb. 28, 2011, pp. 7.
"Samsung Galaxy S—Goodbye Task Killer", retrieved at http://forum.vodafone.co.uk/15/Galaxy-S/Samsung-Galaxy- S-Goodbye-Task-Killer/m-p/513640, retrieved on Feb. 28, 2011, pp. 5.
"Windows Phone and multitasking", retrieved at http://windowsphonesecrets/com/2010/05/20/windows-phone-and-multitasking/, retrieved on Feb. 28, 2011, pp. 2.
"Executing Code in the Background", retrieved at http://developer.apple.com/library/ios#documentation/iphone/conceptual/iphoneosprogrammingguide/BackgroundExecution/BackgroundExecution.html, retrieved on Feb. 25, 2011, pp. 9.
"Application Fundamentals", retrieved at http://developer.android.com/guide/topics/fundamentals.html, retrieved on Feb. 25, 2011, pp. 7.
"How Multitasking Works in the New iPhone OS 4.0", retrieved at http://gizmodo.com/#!5512656/how-multitasking-works-in-the-new-iphone-os-40, retrieved on Feb. 25, 2011, pp. 6.
"WP7: Background Execution—Really?", retrieved at http://www.jayway.com/2011/01/11/wp7-background-execution-really/, retrieved on Feb. 25, 2011, pp. 8.
"iPhone OS 4.0 Background Services Explained", retrieved at http://thecircuit/news/2010/4/9/iphone-os-40-background-services-explained.html, retrieved on Feb. 25, 2011, pp. 6.
"Office Action and Search Report Issued in Taiwan Patent Application No. 101102210", dated Sep. 3, 2014, 13 Pages.
"Non-Final Office Action Issued in U.S. Appl. No. 13/162,459", dated Dec. 20, 2013, 13 Pages.
"Non-Final Office Action Issued in U.S. Appl. No. 13/162,459", dated Jun. 24, 2014, 15 Pages.
"Final Office Action Issued in U.S. Appl. No. 13/162,936", dated Sep. 30, 2013, 20 Pages.
"Non-Final Office Action Issued in U.S. Appl. No. 13/162,936", dated Feb. 15, 2013, 22 Pages.
"Notice of Allowance Issued in U.S. Appl. No. 13/162,936", dated Feb. 13, 2015, 14 Pages.
"Reply to Non-Final Office Action Issued in U.S. Appl. No. 13/162,936", dated Jul. 15, 2013, 10 Pages.
"Non-Final Office Action Issued in U.S. Appl. No. 13/164,497", dated Jan. 17, 2014, 18 Pages.
"Final Office Action Issued in U.S. Appl. No. 13/164,678", dated Feb. 24, 2014, 10 Pages.
"Non-Final Office Action Issued in U.S. Appl. No. 13/164,678", dated Jun. 20, 2014, 11 Pages.
"Non-Final Office Action Issued in U.S. Appl. No. 13/164,678", dated Aug. 29, 2013, 9 Pages.
"First Office Action Issued in Chinese Patent Application No. 201210032726.4", dated Feb. 26, 2016, 16 Pages.
"Third Office Action Issued in Chinese Patent Application No. 201210032726.4", dated Dec. 20, 2016, 18 Pages.
"Second Office Action and Search Report Issued in Chinese Patent Application No. 201210032726.4", dated Sep. 1, 2016, 17 Pages.
"Multitasking made easy", Retrieved from https://www.youtube.com/watch?v=pcow6eydZFw, Jan. 15, 2010, 18 Pages.
"Final Office Action Issued in U.S. Appl. No. 16/001,799", dated Mar. 28, 2019, 4 Pages.

* cited by examiner

TASK SWITCHING ON MOBILE DEVICES

CROSS-REFERENCE TO RELATED APPLICATION

The present application claims priority to U.S. provisional patent applications Ser. Nos. 61/442,701, 61/442,713, 61/442,735, 61/442,740 and 61/442,753, each filed Feb. 14, 2011 and hereby incorporated by reference. The present application is related to U.S. patent applications Ser. nos. 13/164,678, 13/164,497, 13/162,459 and Ser. No. 13/162,936, assigned to the assignee of the present invention, hereby incorporated by reference.

BACKGROUND

Users of mobile devices switch applications into the foreground. Some mobiles devices offer an interface to switch between recently used applications. For example, the user can use a "Back" button to navigate through the user's applications. This technique is inefficient, because not only does the user need to remember which applications were recently used so as to know whether the "Back" button will get to the desired application, the technique does not provide a quick way for the user to resume an application that is more than a couple of back button presses away.

Moreover, there is no clear distinction between resuming an application and launching an application in a fresh state. The user is not offered a choice.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a task switcher provides a straightforward mechanism for a user to view and navigate among previous tasks of applications and arbitrarily switch to any selected task. In general, an application (or other program such as an operating system component) may be comprised of one or more tasks, such as an email application having a mail task, a calendar task, and a contacts task, or a browser program having a task for each tabbed page.

In one aspect, a task switcher (e.g., program) may be invoked by user action, e.g., in response to a user request, and obtains information from a data structure (e.g., a stack). The data structure contains the information (state data) associated with each task of a set of tasks that previously executed on the computing device. The task switcher uses the information to output a representation (e.g., a screenshot with accompanying text) of each task to a user interface of the task switcher. Via the user interface, the user may navigate among the task representations and/or arbitrarily select any task of the set for resuming that task. For example, the application may be re-launched, with state information saved in the stack or elsewhere used to resume the task within its corresponding application.

In one aspect, information associated with a plurality of tasks is maintained, with each task corresponding to an application program that previously executed as a foreground application. A task switcher uses the maintained information for outputting a representation of each task to an interactive user interface. The task switcher detects user interaction (e.g., user navigation and selection) corresponding to user-selection of one of the task representations as a selected task, and takes action to switch to the selected task by resuming the application in a state corresponding to the selected task.

In one aspect, the stack is updated to save information regarding an executing task before replacing the executing task with a task of another application. Maintaining the stack may include releasing data of another task from the stack to provide memory space to save the information regarding the executing task, and/or filtering out data of a duplicate task.

In one aspect, there is described a technology for presenting a view of a stack of task data corresponding to previously executing tasks of applications, in which the view includes visible representations of tasks having task data in the stack. Upon detecting interaction with the view to navigate to a particular task representation, and detecting interaction to select a selected task, execution of the selected task may be resumed.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a reliable and easy technique to resume a previous task that a user was performing on a mobile device, such as a task on a mobile phone. As will be understood, switching "tasks" is more flexible and powerful than switching applications; examples of tasks include a contact card, an email draft, a calendar appointment (e.g., within the same email application), a browser webpage tab, and so forth. Notwithstanding, an application may comprise a single task.

To this end, there is provided a task switcher on a device that provides users with the ability to reliably and to quickly resume or finish a task that was previously started. The task switcher, which in one implementation comprises a program with an accompanying user interface (UI), shows a user the state in which the user's tasks were left, so that the user can easily identify a desired task to resume. Also exemplified herein is one example visual design for showing the last state of a task, accompanied by its name, which provides benefits and advantages relative to an application icon, for example.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and application/task switching in general.

Figure 1:
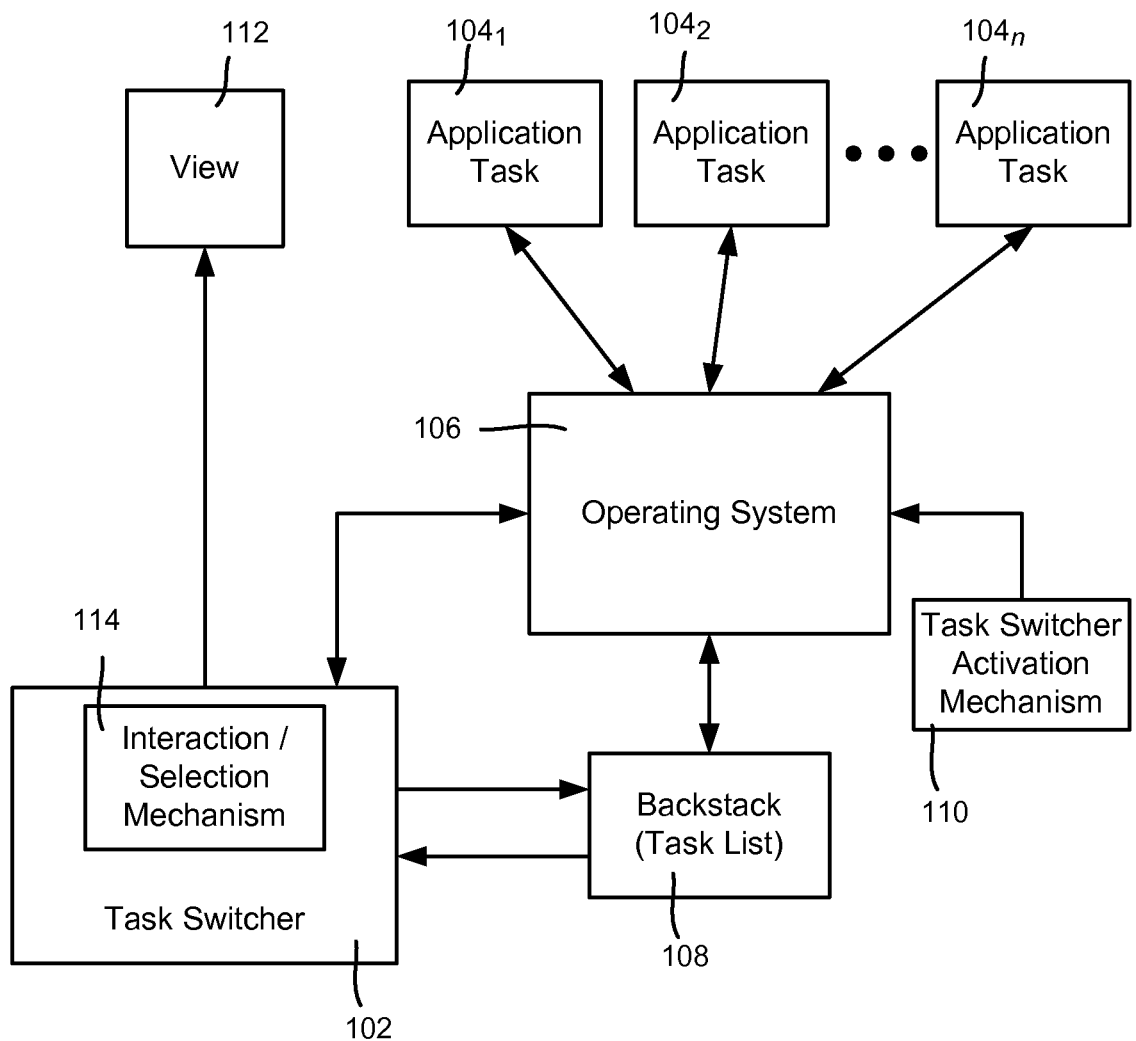
FIG. 1 is a block diagram representing example components used in performing task switching among tasks.

FIG. 1 is a generalized block diagram showing various example components for switching among tasks, including a task switcher 102, where an application has one or more tasks specified for it as defined by the application developer. For example, an application such as a calculator may only have one task, whereas an application such as Microsoft® Outlook may have a mail task, a calendar task, a contacts task, and so on.

In general, a plurality of application tasks $104_1$-$104_n$ may be run in the foreground of the device at different times. Each time a new instance of an application task is run, referred to as a session, the operating system 106 saves information regarding the previous task to a backstack 108. Filtering may be performed, e.g., to avoid adding duplicate tasks to the backstack 108, such as by only allowing one instance of a task/session to be added.

The backstack 108 comprises a data structure (e.g., in memory) that maintains information regarding the saved tasks, as well as information needed to restore a task. For example, the backstack 108 may comprise a list of objects, with each object containing data (and/or a reference to the data) regarding a saved task, such as to provide a screenshot of the task captured when saved, the name of the application, task state data, and so forth. The number of objects may be limited (e.g., by default or user configuration) so as to keep the number of maintained tasks practical for the user, as well as to control memory usage; thus, adding a new task to the backstack removes the oldest task. As described herein, the backstack may be used to maintain (or reference pointers to) screenshots and/or other metadata related to a set of a maintained task or tasks. With the task switcher, users may navigate to any session (and in no specified order) in the backstack. This does not break the navigation within sessions. Note that the backstack maintains the tasks in time order, however a user may navigate to any task, and thus make that task the newest task with the others keeping the same order behind that newest task.

In general, a task switcher activation mechanism 110 comprising a button or the like is detected by a suitable part of the operating system 106, which invokes the task switcher 102. The task switcher 102 may be launched in any suitable way, such as in one implementation in which the task switcher 102 may be launched via a long press on a hardware back button. When invoked, the task switcher (e.g., along with the operating system 106) captures the last state of a task before the user leaves the task, e.g., by adding that task's data to the backstack 108. Note however that data regarding the task switcher 102 need not be added to the backstack 108 when leaving the task switcher 102.

Figure 2:
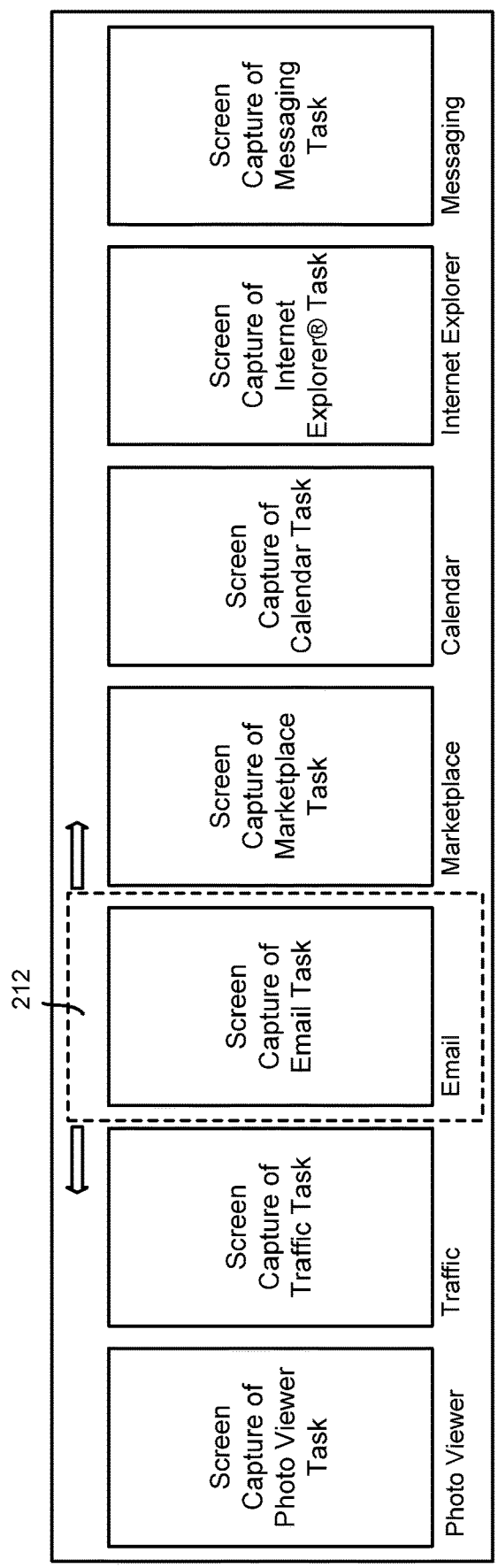
FIG. 2 is an example representation of tasks among which a user may navigate and select for resuming on the device.

The task switcher 102 displays each of the captured task states in some suitable way as a view 112, such as ordered from left to right as generally represented in FIG. 2, e.g., with the left task being the oldest task and the right task being the newest one. In one view, only one task is shown at a time, as represented by the dashed "view" box 212, and users can pan horizontally (as represented by the arrows) to find a previous or later task via an interaction/selection mechanism 114 (FIG. 1), with selection able to be made on the currently shown task. In another view, users can see multiple tasks at the same time, and pick one via the interaction/selection mechanism 114, such as by tapping on the task's screen capture image. Thus, the user may make an arbitrary selection of any task to resume via its displayed representation, rather than having to resume in sequential order. The user can also cancel without making any selection, whereby the task that was running when the user invoked the task switcher is resumed.

As can be readily appreciated, virtually any view with an appropriate selection mechanism is feasible, subject to practical screen size limitations. Moreover, instead of or in addition to a screen capture, some other representation of the task may be provided, along with possibly additional text (e.g., timestamp), graphics, animation, video and so forth.

Note that multi-tasking allows applications to continue to work even when they are not in the foreground, including via a task model that allows users to navigate in the forward direction and allow back navigations one page at a time. To quickly resume previously used applications to the foreground, the task switcher allows a user to quickly view and navigate among application tasks (e.g., user interfaces) maintained in the backstack.

Turning to additional details of one example implementation, a long press on the back hardware button beyond a threshold time (e.g., the duration of the press-and-hold button press is on the order of 800 ms) launches the task switcher UI, comprising the sessions in the backstack, each represented by a screen capture of the session's last page as generally represented in FIG. 2. In this implementation, the screen captures are ordered from left to right, with the most recent being in the most right. The UI pans horizontally. Tapping on a screen capture resumes the corresponding session at that page, that is, each screen capture in FIG. 2 represents a task which the user may resume by tapping on its screen capture. Transition animations may be used for any screen image change, and the background may use the current accent theme color.

Sessions are added in order, e.g., whereby the most recent session is the rightmost screen capture. The task switcher launches with the right most screenshot in view. In one implementation, the task switcher does not remember its scrolled state so as to consistently provide a predictable default view.

When a session is resumed from the task switcher, it is moved from its current position to the rightmost position, as the most recent session. A short press on back navigates within the current session. The behavior of the backstack does not change. The start screen does not show in the task switcher, and the only way to get to Start is via the Start hardware button in one implementation.

The task switcher uses screen captures for the user to identify a task that he or she wants to resume. A screen capture of the last page of a session is used to represent the session. The screen capture may include transient UI like reminders, alarms and message boxes. In order to help users better identify a task, one implementation may display the corresponding application name beneath the screen capture.

The task switcher may be dismissed when the phone locks (either manually by the user or automatically after a timeout). It does not work above the lock screen. When the task switcher is in the foreground and the incoming call UI appears, the task switcher stays behind the call UI so that the user can continue a task after dealing with the incoming call. The behavior of the incoming call UI does not change.

| Example Hardware Buttons with respect to Task Switcher | |
|---|---|
| Button | Behavior |
| Start | Dismisses the task switcher and launches Start |
| Back | Dismisses the task switcher |
| Search | Dismisses the task switcher and launches Search |
| Volume | Works over task switcher |
| Power | Dismisses task switcher and locks the phone |
| Camera | Dismisses the task switcher and launches Camera |

When there are no sessions in the task switcher, one implementation may show a screen capture of Start. When tapped on, Start is brought to the foreground. This way, the user is never "dead-ended" in the task switcher.

Because one goal is to present a literal backstack, each tab in the browser may show as an individual session in the task switcher.

Figure 3:
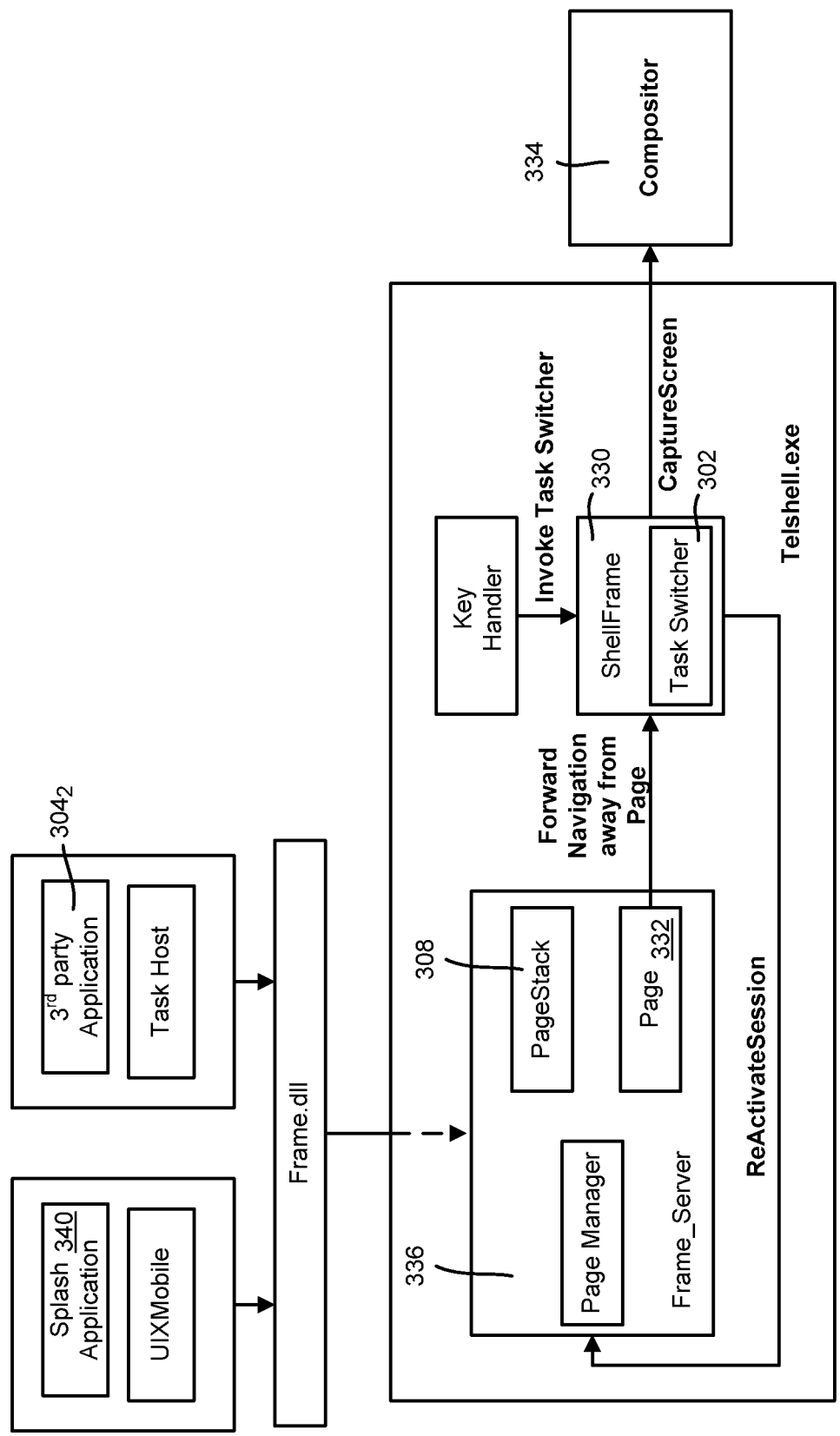
FIG. 3 is a block diagram representing example components used in one implementation of a task switching system.

FIG. 3 shows additional details of an example architecture version, (with labels 3xx instead of 1xx for like or similar components) in which the task switcher 302 may be a part of the shell chrome and thus may reside in the shell frame 330 (e.g., ShellFrame.dll). Note that if a task switcher is instead a separate application, bringing it up as a conventional application may force another application off of the backstack 108 (corresponding to the PageStack 308 in FIG. 3), which is generally not desirable. Thus, the task switcher 302 may be kept in the shell frame 330 to avoid having an application removed from the backstack/PageStack 308 when the task switcher 302 gets launched. Additionally, it may be easier to handle z-ordering of the task switcher UI relative to other chrome components, e.g. Lock screen, ARDs (because the shell frame 330 handles top level z-order policy). The task switcher may be part of the system chrome, and sits relatively low in the z-order, whereby the previous foreground application receives an obscured message when the task switcher is launched above it. Also being inside the shell frame 330 may facilitate custom transitions between the task switcher and the applications.

In one implementation generally represented in FIG. 3, the screenshot of the application's page is captured each time the user or the like navigates forward to a new session or a new child task; (note that any part of the screen image not part of the application (e.g., a pop-up "toast" message may be not included in the capture). More particularly, in one implementation, a call may be made from within frame_server's Page::SendOnHideRequest( ) API. This API is executed by the application that is being navigated to but within telshell's process space (e.g., a PSL call from application into frame_server).

Figure 4:
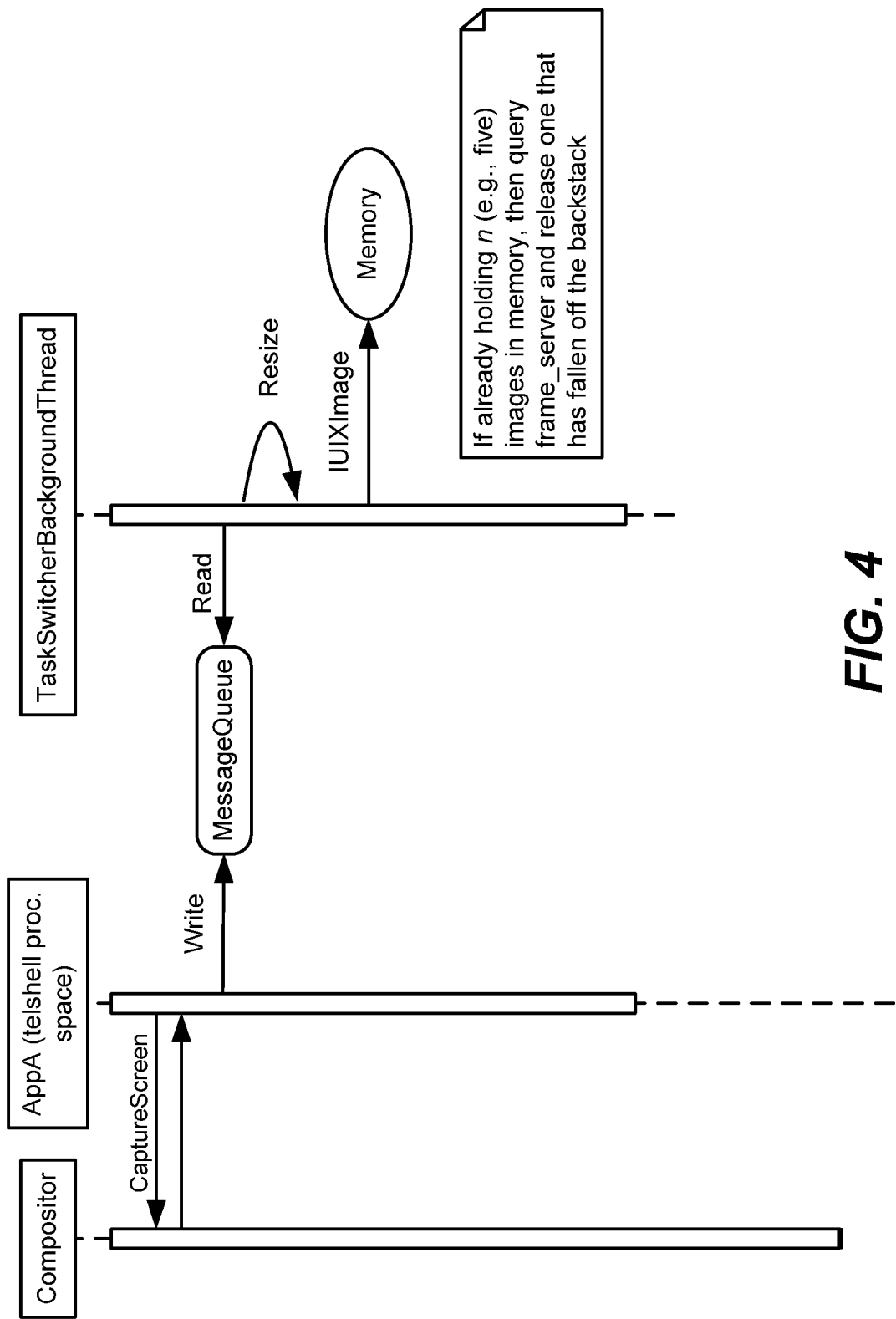
FIG. 4 is an example timing sequence/dataflow diagram showing operations related to how information including a captured screen image is obtained and maintained in a task switching system.

As represented in the timing/sequence diagram of FIG. 4, the screen capture (BITMAP) may be obtained by calling a CaptureScreen API exposed by a compositor 334 (e.g., compositor.exe via coredll). Once obtained, the handle to the HBITMAP may be written into a message queue. A background thread (e.g., of the task switcher) running in telshell may consume this HBITMAP, StretchBlt it to an appropriate size (e.g., 259*439) and then convert it into an IUIXImage.

The background thread may maintain a list of up to n (e.g. five) such IUIXImages and their corresponding SessionIds. When a request comes in for an n+1 (e.g., sixth) image, the thread may query into Frame_Server 336 to obtain the list of active sessions and overwrite (release and reallocate) the image corresponding to the session that has fallen off the backstack/pagestack 308. Note that in one implementation, because the allocations are greater than 16K, these may be virtual allocations whereby memory fragmentation is not an issue.

Note that one implementation may show one page associated with a session. As a result, if the user navigates to a child task then one implementation may overwrite the screenshot of the parent task with the screenshot of the child task.

Returning to FIGS. 1 and 2, the task switcher 102 may show the (localized) title of the application just below each screenshot (FIG. 2). An API or the like may be provided for the task switcher 102 to resume the application's session (once the user has selected the UI), regardless of the activation policy of the application. The task switcher user interface shows a screenshot of the topmost page of each session that is on the backstack 108. In order to know which sessions are currently on the backstack, the frame_server 336 (FIG. 3) may be queried, e.g., via an API.

In order to obtain the localized title of the application, one implementation may pass in a ProductId to a package manager, in which the ProductId may be obtained using the Friendly Name (or TaskURI if Friendly Name does not exist) associated with the task in a list obtained from DumpTasks. Note that while the DumpTasks gives the SessionIds, one implementation may need to rely on the PAGESTACKCONTAINERDESC information obtained from the TestHook_GetPageStackContainerList API because there is a need to be able to distinguish the sessions that are on the backstack 108 and those which are not on the backstack 108 but have not yet been destructed.

In memory size of the images, one implementation may capture (after resizing) 454 KB (439*259*4) of image data. One implementation may have n such images loaded at a given time (e.g., n may be five thereby consuming approximately 2.2 MB), however other implementations may have different numbers of n images depending on image size and available memory. Also note that the dimensions are subject to change, e.g., depending on whether or not UI artifacts for borders and lines result due to the resizing.

One implementation refreshes the images while task switcher is active. This may be achieved by passing in raw bits (i.e. IUIXImage) to a splash (internal implementation) application 340. This causes the splash application to allocate two buffers for the image, one comprising the original buffer and the second comprising a DX texture used by the renderer.

Figure 5:
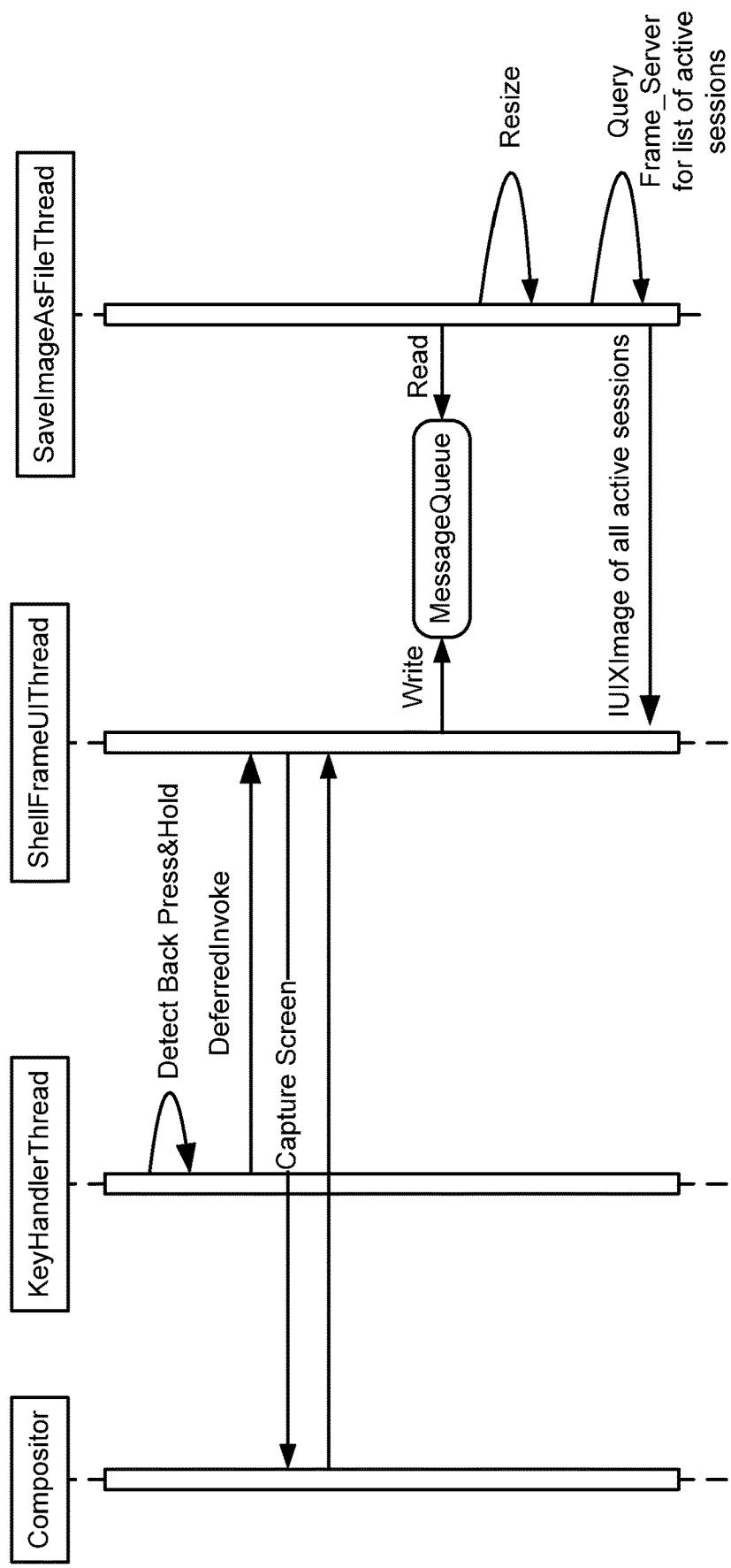
FIG. 5 is an example timing sequence/dataflow diagram showing operations related to invoking a task switcher.

As described above and represented in the timing sequence diagram of FIG. 5, to invoke the task switcher 102 the user may press and hold the back button. This may be detected by the key handler thread which lives in telshell. The key handler thread may then make a deferred invoke call into ShellFrame, i.e. pass off execution to ShellFrame's UI thread, which may initiate the task switcher's invocation process. The invocation process may include taking a screenshot of the currently visible application UI and bringing up the task switcher UI. In one implementation the CaptureScreen API exposed by the Compositor sometimes takes a little over 100 ms. Because the UI thread cannot be blocked for longer than 100 ms, the UI thread may not process the HBITMAP obtained, but instead may put this into the message queue for the background thread to process. The UI thread may show some kind of a temporary "loading" screen in the task switcher UI. When the background thread gets notified that the UI is coming up (e.g., through a named event or the message inserted into the queue by the UI thread being marked as "Alert"), it may query into frame_server to get a list of currently active sessions and populate the UI with the appropriate IUIXImages. Once the user selects which session UI he or she wants to navigate to (e.g., by clicking the appropriate screenshot), the task switcher may call into the frame_server 336 asking it to reactivate the task selected by the user. In one implementation, the API that may be used is PageManager::ReActivateSession( ) Because the frame_server 336 is queried when there are more than n images and also when the task switcher UI is coming up, one implementation may not need to explicitly be notified when the tasks/sessions are going away.

In this manner, there is provided a simple navigation model for users and developers. In general, launching an application from Start takes the user to the application's default experience, while launching an application from the task switcher 102 (e.g., via the back hardware button) resumes the application to the state in which the user left it.

With respect to multi-tasking, the model creates a number of background services that can perform tasks on an application's behalf. These services effectively enable applications to continue to work even when they are not in the foreground. Furthermore, a previously used application may be reasonably quickly to the foreground. Multi-tasking combined with fast-application-resume improves the user's ability to switch between multiple applications in order to complete a task.

Although the back button provides convenient access to the last used application, it is not an efficient method to jump to a previous application that is farther than one back press away. Thus, the task switcher provides a more efficient way to help users resume and finish a previous task.

There is thus provided easy and reliable access to the task switcher from anywhere. The task switcher shows previously opened tasks, and allows users to launch a previous task. Launching a task moves its session to the top of the backstack.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

Exemplary Operating Environment

Figure 6:
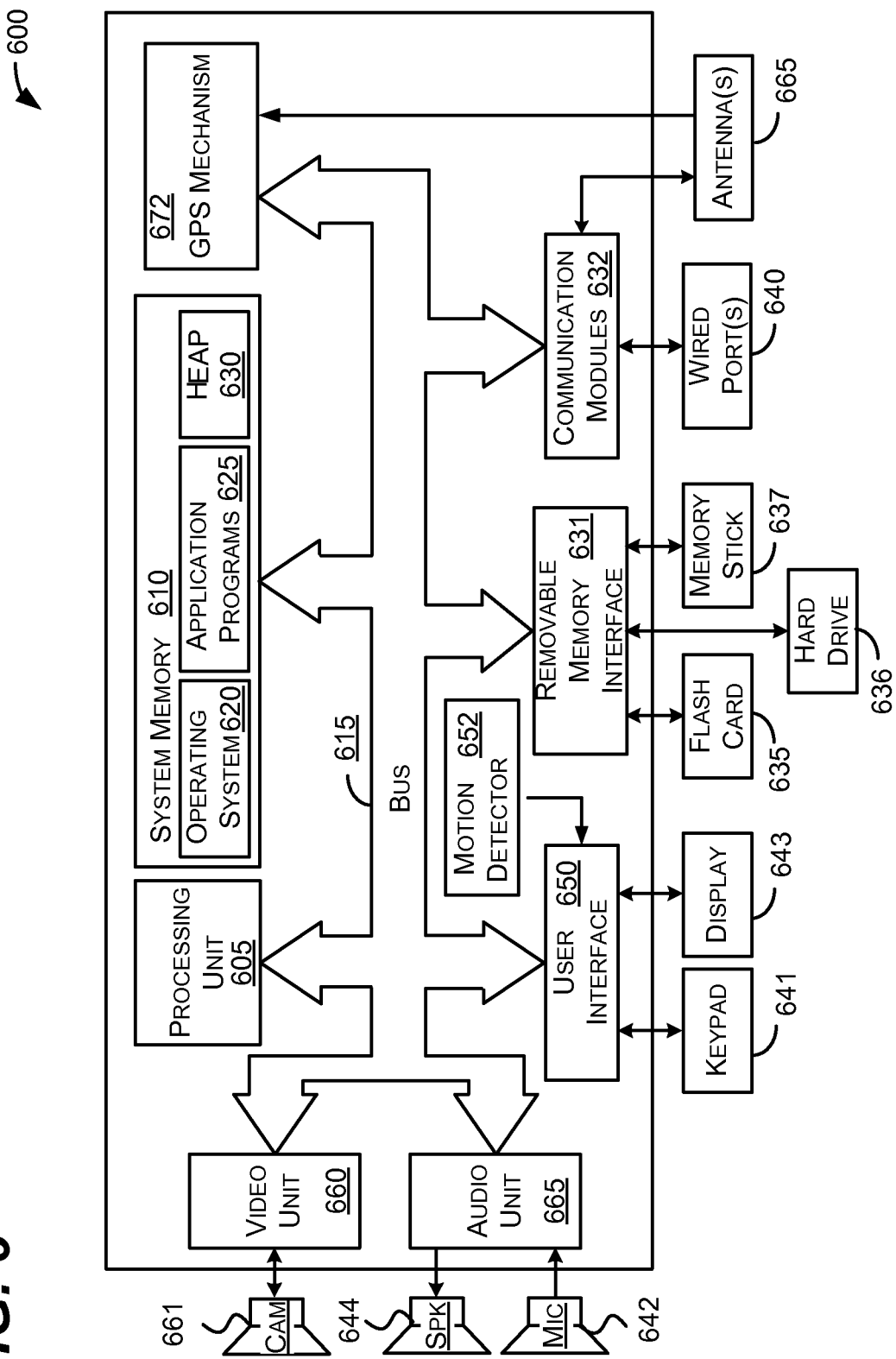
FIG. 6 is a block diagram representing an exemplary non-limiting computing system or operating environment, e.g., in the example of a mobile phone device, in which one or more aspects of various embodiments described herein can be implemented.

FIG. 6 illustrates an example of a suitable mobile device 600 on which aspects of the subject matter described herein may be implemented. The mobile device 600 is only one example of a device and is not intended to suggest any limitation as to the scope of use or functionality of aspects of the subject matter described herein. Neither should the mobile device 600 be interpreted as having any dependency or requirement relating to any one or combination of components illustrated in the exemplary mobile device 600.

With reference to FIG. 6, an exemplary device for implementing aspects of the subject matter described herein includes a mobile device 600. In some embodiments, the mobile device 600 comprises a cell phone, a handheld device that allows voice communications with others, some other voice communications device, or the like. In these embodiments, the mobile device 600 may be equipped with a camera for taking pictures, although this may not be required in other embodiments. In other embodiments, the mobile device 600 may comprise a personal digital assistant (PDA), hand-held gaming device, notebook computer, printer, appliance including a set-top, media center, or other appliance, other mobile devices, or the like. In yet other embodiments, the mobile device 600 may comprise devices that are generally considered non-mobile such as personal computers, servers, or the like.

Components of the mobile device 600 may include, but are not limited to, a processing unit 605, system memory 610, and a bus 615 that couples various system components including the system memory 610 to the processing unit 605. The bus 615 may include any of several types of bus structures including a memory bus, memory controller, a peripheral bus, and a local bus using any of a variety of bus architectures, and the like. The bus 615 allows data to be transmitted between various components of the mobile device 600.

The mobile device 600 may include a variety of computer-readable media. Computer-readable media can be any available media that can be accessed by the mobile device 600 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 600.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 610 includes computer storage media in the form of volatile and/or nonvolatile memory and may include read only memory (ROM) and random access memory (RAM). On a mobile device such as a cell phone, operating system code 620 is sometimes included in ROM although, in other embodiments, this is not required. Similarly, application programs 625 are often placed in RAM although again, in other embodiments, application programs may be placed in ROM or in other computer-readable memory. The heap 630 provides memory for state associated with the operating system 620 and the application programs 625. For example, the operating system 620 and application programs 625 may store variables and data structures in the heap 630 during their operations.

The mobile device 600 may also include other removable/non-removable, volatile/nonvolatile memory. By way of example, FIG. 6 illustrates a flash card 635, a hard disk drive 636, and a memory stick 637. The hard disk drive 636 may be miniaturized to fit in a memory slot, for example. The mobile device 600 may interface with these types of non-volatile removable memory via a removable memory interface 631, or may be connected via a universal serial bus (USB), IEEE 6394, one or more of the wired port(s) 640, or antenna(s) 665. In these embodiments, the removable memory devices 635-637 may interface with the mobile device via the communications module(s) 632. In some embodiments, not all of these types of memory may be included on a single mobile device. In other embodiments, one or more of these and other types of removable memory may be included on a single mobile device.

In some embodiments, the hard disk drive 636 may be connected in such a way as to be more permanently attached to the mobile device 600. For example, the hard disk drive 636 may be connected to an interface such as parallel advanced technology attachment (PATA), serial advanced technology attachment (SATA) or otherwise, which may be connected to the bus 615. In such embodiments, removing the hard drive may involve removing a cover of the mobile device 600 and removing screws or other fasteners that connect the hard drive 636 to support structures within the mobile device 600.

The removable memory devices 635-637 and their associated computer storage media, discussed above and illustrated in FIG. 6, provide storage of computer-readable instructions, program modules, data structures, and other data for the mobile device 600. For example, the removable memory device or devices 635-637 may store images taken by the mobile device 600, voice recordings, contact information, programs, data for the programs and so forth.

A user may enter commands and information into the mobile device 600 through input devices such as a key pad 641 and the microphone 642. In some embodiments, the display 643 may be touch-sensitive screen and may allow a user to enter commands and information thereon. The key pad 641 and display 643 may be connected to the processing unit 605 through a user input interface 650 that is coupled to the bus 615, but may also be connected by other interface and bus structures, such as the communications module(s) 632 and wired port(s) 640. Motion detection 652 can be used to determine gestures made with the device 600.

A user may communicate with other users via speaking into the microphone 642 and via text messages that are entered on the key pad 641 or a touch sensitive display 643, for example. The audio unit 655 may provide electrical signals to drive the speaker 644 as well as receive and digitize audio signals received from the microphone 642.

The mobile device 600 may include a video unit 660 that provides signals to drive a camera 661. The video unit 660 may also receive images obtained by the camera 661 and provide these images to the processing unit 605 and/or memory included on the mobile device 600. The images obtained by the camera 661 may comprise video, one or more images that do not form a video, or some combination thereof.

The communication module(s) 632 may provide signals to and receive signals from one or more antenna(s) 665. One of the antenna(s) 665 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 672. In turn, the GPS mechanism 672 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 600 may connect to one or more remote devices. The remote devices may include a personal computer, a server, a router, a network PC, a cell phone, a media playback device, a peer device or other common network node, and typically includes many or all of the elements described above relative to the mobile device 600.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computing device comprising:
   at least one processor:
   a memory communicatively coupled to the at least one processor and including components comprising:
   a task switcher configured to obtain information from a data structure, the data structure containing data consisting of a subset of a set of tasks running on the computing device when the task switcher is invoked, the task switcher further configured to use the information to output a representation of each task of the subset of the set of tasks to a user interface, the representation of each task of the subset of the set of tasks comprising at least part of a screenshot corresponding to running that task in which the representation is refreshed while the task switcher is active; and an interaction mechanism configured to detect user interaction directed towards invoking the task switcher, and when detected, to take action to invoke the task switcher, wherein the interaction mechanism comprises a hardware button, and wherein the interaction mechanism detects the user interaction by detecting a press-and-hold of the hardware button that occurs for at least a fixed threshold duration.

2. The computing device of claim 1 wherein the interaction mechanism is incorporated into a back button.

3. The computing device of claim 1 wherein a single application program runs the subset of tasks of the set of tasks.

4. The computing device of claim 1 wherein the data structure comprises a stack in which the task switcher is not considered to be a task.

5. The computing device of claim 1 wherein the subset of tasks comprises a recent task.

6. The computing device of claim 1 wherein the task switcher further configured to allow arbitrary user-selection of any task of the subset of tasks for resuming that task.

7. In a computing environment, a method performed at least in part on at least one processor, comprising:
   detecting an invocation of an interactive user interface for navigating a plurality of tasks;
   maintaining information corresponding to only a subset of the plurality of tasks, at least one task of the subset corresponding to an application program that executed as a foreground application;
   updating the maintained information to save state data regarding an executing task before running a task of another application to replace the executing task and releasing data of the at least one task from the maintained information to provide memory space to save the state data regarding the executing task;
   in response to a change in the state data while the interactive user interface is invoked, outputting a representation of the executing task to the interactive user interface in which the representation comprises a screen capture corresponding to a last state of that task;
   detecting user interaction to select one of the subset of tasks as a selected task; and
   switching to the selected task by resuming the application in the last state corresponding to the selected task.

8. The method of claim 7 wherein detecting user interaction to select one of the subset of tasks as a selected task comprises detecting first interaction to navigate to a particular task, and detecting second interaction to select the selected task.

9. The method of claim 7 further comprising, capturing a most recent screenshot corresponding to each task of the subset of tasks, and using at least part of the most recent screenshot as the representation of each task.

10. The method of claim 7 further comprising capturing a screenshot representing a temporary loading screen.

11. The method of claim 7 wherein maintaining the information associated with a plurality of tasks comprises maintaining a stack, and further comprising, updating the stack to save information regarding an executing task before replacing the executing task by running a task of another application.

12. The method of claim 11 wherein maintaining the stack comprises releasing data of another task from the stack to provide memory space to save the information regarding the executing task.

13. The method of claim 11 wherein maintaining the stack comprises filtering out data of a duplicate task.

14. Computer-readable storage hardware having computer-executable instructions, which in response to execution by a computer, cause the computer to perform steps, comprising:
   presenting a view of a stack of task data consisting of executing tasks of applications in time order, in which the view includes visible representation of only a most recent task in the stack;
   detecting interaction with the view to cause navigation in a forward direction or a backward direction, to a particular task representation;
   detecting interaction to select as a selected task an executing task corresponding to the particular task representation; and
   resuming execution of the selected task.

15. The computer-readable storage hardware of claim 14 having further computer-executable instructions comprising, detecting a request to invoke a task switching program, wherein presenting the view of the stack occurs in response to the request.

16. The computer-readable storage hardware of claim 14 having further computer-executable instructions comprising updating the stack upon detecting an operation directed towards launching another task.

17. The computer-readable storage hardware of claim 14 having further computer-executable instructions comprising, capturing screenshots and obtaining text data corresponding to the tasks, and using the screenshots and text data as the visible representations of the tasks.

18. The computer-readable storage hardware of claim 14 wherein the visible representation comprises a screen capture of a most recent page of the most recent task.

* * * * *